United States Patent [19]

Mikami et al.

[11] Patent Number: 5,672,138

[45] Date of Patent: Sep. 30, 1997

[54] CONTROL SYSTEM FOR AUTOMATIC TRANSMISSION

[75] Inventors: Tsuyoshi Mikami, Toyota; Hidehiro Oba, Numazu; Nobuaki Takahashi, Toyota, all of Japan

[73] Assignee: Toyota Jidosha Kabushiki Kaisha, Toyota, Japan

[21] Appl. No.: 606,849

[22] Filed: Feb. 26, 1996

[30] Foreign Application Priority Data

Mar. 3, 1995 [JP] Japan ........................... 7-070671

[51] Int. Cl.$^6$ ........................................... B60K 41/04
[52] U.S. Cl. ............................... 477/111; 477/110
[58] Field of Search ..................... 477/90, 107, 110, 477/111, 181

[56] References Cited

U.S. PATENT DOCUMENTS

| | | | |
|---|---|---|---|
| 4,750,598 | 6/1988 | Danno et al. | 477/111 |
| 4,823,266 | 4/1989 | Baltusis et al. | 477/111 |
| 5,235,877 | 8/1993 | Takahashi et al. | 477/123 |
| 5,470,289 | 11/1995 | Pioch et al. | 477/111 |

FOREIGN PATENT DOCUMENTS 5-1589  1/1993  Japan.

*Primary Examiner*—Charles A. Marmor
*Assistant Examiner*—Sherry Lynn Estremsky
*Attorney, Agent, or Firm*—Oblon, Spivak, McClelland, Maier & Neustadt, P.C.

[57] ABSTRACT

A control system serves for surely preventing occurrence of a shift shock due to engagement of a one-way clutch with an automatic transmission in non-shift condition, and comprises a disengagement detecter for detecting disengagement of the one-way clutch; a power-on detecter for detecting change in an operation of the engine from driven mode to drive mode; a throttle opening detecter for detecting a throttle opening of the engine; a throttle opening estimater for estimating a second throttle opening when a predetermined time has elapsed from the time at which the operation of the engine is changed from driven mode to drive mode, on the basis of a first throttle opening detected when the operation of the engine is changed from driven mode to drive mode; and a torque down instructer for generating a torque down signal for reducing the output torque of the engine when the estimated second throttle opening is not less than a predetermined reference value.

10 Claims, 5 Drawing Sheets

FIG.5

| | C₀ | C₁ | C₂ | B₀ | B₁ | B₂ | B₃ | B₄ | F₀ | F₁ | F₂ |
|---|---|---|---|---|---|---|---|---|---|---|---|
| N | | | | ◌ | | | | | | | |
| REV. | | | ○ | ○ | | | | ○ | | | |
| 1ST | ○ | ○ | | | | | | ● | ○ | | ○ |
| 2ND | ● | ○ | | | | | ○ | | ○ | | |
| 3RD | ○ | ○ | | | ● | ○ | | | ○ | ○ | |
| 4TH | ○ | ○ | ○ | | | △ | | | ○ | | |
| 5TH | | ○ | ○ | ○ | | △ | | | | | |

CONTROL SYSTEM FOR AUTOMATIC TRANSMISSION

BACKGROUND OF THE INVENTION

1. Field of the Invention

This invention relates to a control system for an automatic transmission connected with an engine, and more particularly to a control system for generating a command signal for reducing an output torque of the engine whereby a shift shock occurring when a one-way clutch of the automatic transmission is changed from disengaged state to engaged state, is lowered.

2. Related Art

As is known in conventional automatic transmissions for use in vehicles, in order to prevent a shift shock and facilitate a shift control, a one-way clutch has been used to set each of low and intermediate speed gear stages. When such low and intermediate speed gear stages are set, the one-way clutch for each gear stage is applied with a torque and thereby engaged. On the other hand, the one-way clutch is disengaged due to release of the torque therefrom when the transmission is shifted from these gear stages to the other gear stage. The disengagement of the one-way clutch has been also caused in a coasting condition of the vehicle.

It is hitherto known in the art that an output torque of the engine is reduced upon shift to eliminate the shift shock. Besides, even in the case of non-shift condition of the automatic transmission, there is a possibility that the one-way clutch is changed from disengaged state to engaged state depending upon a manner of applying a torque to the one-way clutch. In consequence, in order to prevent such a shift shock due to the torque-applying manner, it has been also required to reduce the output torque of the engine.

As one measure to overcome the above-mentioned problem, JP-A-5-1589 discloses a control system for reducing an output torque of an engine. The control system detects a condition able to engage immediately before a one-way clutch is changed-over from disengaged state to engaged state due to the change in operation of the engine from power-off mode to power-on mode in non-shift condition of the automatic transmission. The detection causes reduction of the output torque of the engine upon engagement of the one-way clutch. Specifically, in this conventional control system, input and output revolution speeds of the automatic transmission are detected. On the basis of detection results of the input and output revolution speeds, a judgment is made as to whether or not the one-way clutch is in the condition able to engage immediately.

In order to prevent occurrence of the shift shock due to the engagement of the one-way clutch in non-shift condition of the automatic transmission, it is necessary to lower an inertia torque of a rotary member which undergoes change in its revolution speed upon the engagement of the one-way clutch. This is suitably accomplished by reducing the output torque of the engine as described above. However, a time required to cause the one-way clutch to be changed from disengaged state to engaged state is extremely short while it takes a long time to judge, based on the detection results of the input and output revolution speeds, whether or not the one-way clutch is in the condition able to engage immediately. As a result, in the aforementioned conventional control system, an undesirable delay is likely to occur in controlling the output torque of the engine. In such a conventional control system in which the output torque of the engine is controlled based on the detection results of the input and output revolution speeds of the automatic transmission, the inertia torque of the rotary member cannot be reduced to a sufficiently low level upon the engagement of the one-way clutch, so that reduction of the shift shock occurring upon the engagement of the one-way clutch is not satisfactorily achieved.

Further, in order to eliminate the above-mentioned deficiencies, it will be possible that the reduction of the engine torque is performed over a long period of time before and after the time at which the one-way clutch is changed from disengaged state to engaged state. In such a long-time control, although the shift shock due to the engagement of the one-way clutch is reduced, there occurs another problem that a sufficient acceleration cannot be obtained due to the low engine torque even if an accelerator pedal is depressed to change the operation of the engine from power-off mode to power-on mode. As a result, a so-called delayed response becomes remarkable, which results in deterioration of a drivability.

SUMMARY OF THE INVENTION

It is therefore an object of the present invention to provide a control system capable of surely reducing an shift shock generated in association with engagement of a one-way clutch, without deterioration of a drivability.

It is another object of the present invention to provide a control system capable of judging whether a torque down of an engine is to be executed or not, by estimating an engine load at the time at which a one-way clutch is engaged.

It is a further object of the present invention to provide a control system capable of judging whether a torque down of an engine is to be executed or not, on the basis of an actual engine load at the time at which a one-way clutch is engaged.

Accordingly, the control system according to the present invention is applicable to an automatic transmission equipped with a one-way clutch to set a desired gear stage. The control system is so constructed that, when the one-way clutch is changed from disengaged state to engaged state in non-shift condition of the automatic transmission, a torque down signal is generated to reduce an output torque of the engine. Consequently, in one aspect of the present invention, there is provided a control system for an automatic transmission having a plurality of gear stages, which is capable of generating a torque down signal for reducing an output torque of an engine when a one-way clutch for setting a given gear stage is changed from disengaged state to engaged state in non-shift condition of the automatic transmission, and comprises a release detecting means for detecting disengagement of the One-way clutch, a power-on detecting means for detecting change in an operation of the engine from driven mode to drive mode, a throttle opening detecting means for detecting a throttle opening of the engine, a throttle opening estimating means for estimating a second throttle opening when a predetermined time has elapsed from the time at which the operation of the engine is changed from driven mode to drive mode, on the basis of a first throttle opening detected when the engine operation is changed from the driven mode to drive mode, and a torque down instructing means for generating a torque down signal for reducing the output torque of the engine, when the estimated second throttle opening is not less than a predetermined reference value.

In accordance with the present invention, the disengaged state of the one-way clutch is detected by the release detecting means. The changeover of the engine operation from driven mode to drive mode is detected by the power-on detecting means. Further, the throttle opening of the engine is detected by the throttle opening detecting means. When the operation of the engine is changed from driven mode to drive mode with the one-way clutch disengaged, the second throttle opening when a predetermined time has elapsed from the change in the operation of the engine from driven mode to drive mode is estimated by the throttle opening estimating means on the basis of the first throttle opening detected by the throttle opening detecting means when the operation of the engine is changed from driven mode to drive mode. If the estimated second throttle opening is not less than the predetermined reference value, the torque down signal is generated from the torque down instructing means.

That is, if the throttle opening when the predetermined time has elapsed from the time at which the throttle opening is changed from idling condition to non-idling condition is relatively large, it is considered that the shift shock due to the engagement of the one-way clutch also becomes large. In consequence, in the control system according to the present invention, when it is judged that the throttle opening after the predetermined elapsed time becomes large, the torque down signal is generated so that an input torque to the automatic transmission is reduced. Accordingly, at the time when the one-way clutch is engaged, the output torque of the engine can be decreased to a sufficiently low level. As a result, the torque down control is carried out without delay, so that the shift shock due to the engagement of the one-way clutch can be surely reduced or eliminated.

Moreover, in another aspect of the present invention, there is provided a control system which comprises, instead of the throttle opening estimating means and the torque down instructing means as described above, a throttle opening estimating means for estimating a second throttle opening when a first predetermined time has elapsed from the time at which the engine operation is changed from driven mode to drive mode with a one-way clutch disengaged, on the basis of a first throttle opening detected at the time at which the change in the engine operation to drive mode occurs, and a torque down instructing means for generating a torque down signal either in case the estimated second throttle opening is not less than a first predetermined reference value, or in case a third throttle opening detected when a second predetermined time has elapsed from the time at which the engine operation is changed form driven mode to drive mode with the one-way clutch disengaged, is not less than a second predetermined reference value.

In the thus constructed control system, in addition to the estimation of the second throttle opening, the third throttle opening detected when the second predetermined time has elapsed from the time at which the engine operation is changed to power-on mode, is compared with the second predetermined reference value. Either in case the estimated second throttle is not less than the first predetermined reference value, or in case the third throttle opening after the second predetermined elapsed time is not less than the second predetermined reference value, the torque down instructing means generates the torque down signal so that the output torque of the engine can be reduced. Therefore, even though the estimated second throttle opening is lower than the first predetermined reference value due to slow increase in the throttle opening, the output torque of the engine can be reduced as far as the actual throttle opening (the third throttle opening) is large (in this case, it is also considered to cause a large shift shock), so that the shift shock due to the engagement of the one-way clutch can be surely reduced or eliminated.

The above and further objects and novel feature of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 5 is a view showing a clutch/brake application chart for setting respective speed gear stages of the gear train shown in FIG. 4.

DESCRIPTION OF THE PREFERRED EMBODIMENTS

The preferred embodiments of the present invention will now be described by referring to the accompanying drawings.

Figure 1:
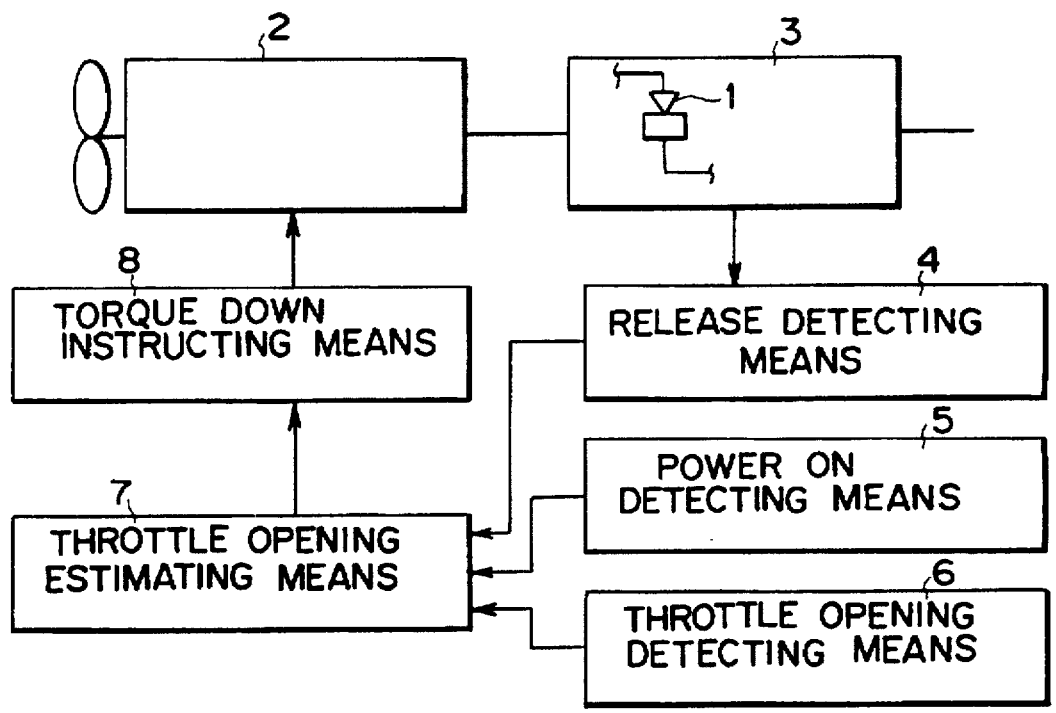
FIG. 1 is a block diagram showing functional means in accordance with a first preferred embodiment of the present invention.
Figure 2:
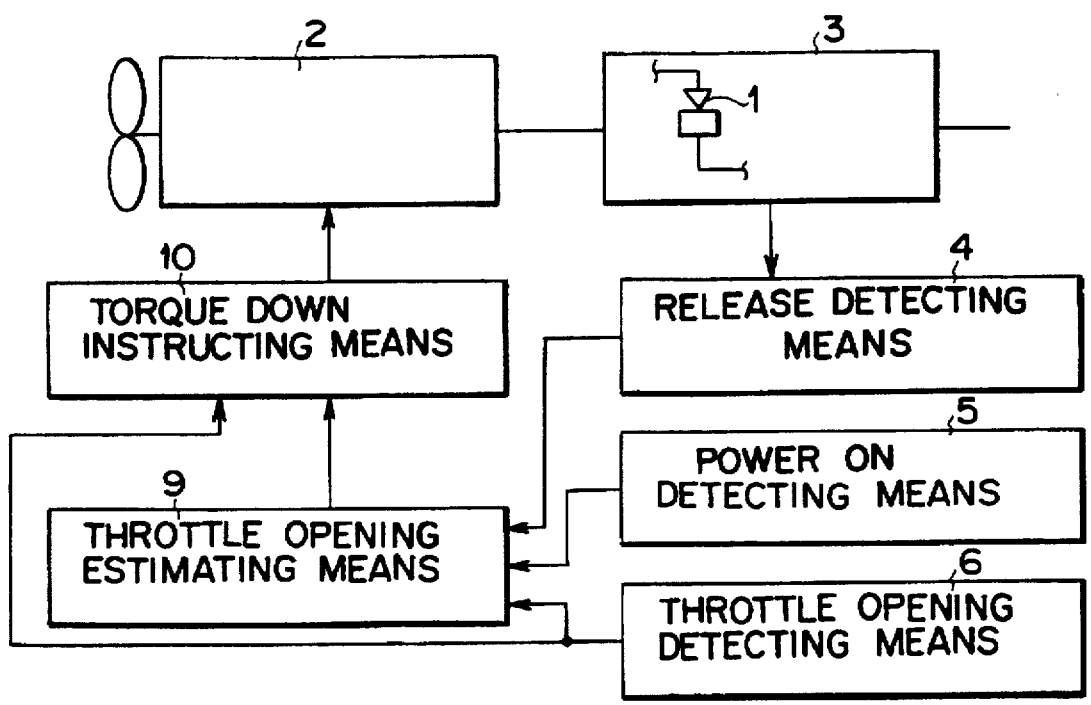
FIG. 2 is a block diagram showing functional means in accordance with a second preferred embodiment of the present invention.

Referring to FIGS. 1 and 2, there are shown basic constructions of control systems according to first and second preferred embodiments of the present invention. The control system as shown in FIG. 1 generates a torque down signal for reducing an output torque of an engine 2 when a one-way clutch 1 of an automatic transmission 3 is switched from disengaged state to engaged state in non-shift condition of the automatic transmission 3. The control system includes a release detecting means 4 for detecting the disengagement of the one-way clutch 1, a power-on detecting means 5 for detecting change in operation of the engine 2 from driven mode (power-off) to drive mode (power-on), a throttle opening detecting means 6 for detecting a throttle opening, a throttle opening estimating means 7 for estimating a second throttle opening when a predetermined time has elapsed from the time at which the operation of the engine 2 is changed from driven mode to drive mode, based on a first throttle opening detected upon the change in the operation of the engine 2 to drive mode, and a torque down instructing means 8 for generating a torque down signal when the estimated second throttle opening is not less than a predetermined reference value.

On the other hand, a control system as shown in FIG. 2 also generates a torque-down signal for reducing the output torque of the engine 2 when the one-way clutch 1 of the automatic transmission 3 is switched from disengaged state to engaged state in non-shift condition of the automatic transmission 3. The control system comprises a release detecting means 4 for detecting the disengagement of the one-way clutch 1, a power-on detecting means 5 for detecting change in the operation of the engine 2 from driven mode (power-off) to drive mode (power-on), the throttle opening detecting means 6 for detecting a throttle opening, an throttle opening estimating means 9 for estimating a second throttle opening when a first predetermined time has elapsed from the time at which the operation of the engine 2 is changed from driven mode to drive mode, based on a first throttle opening detected upon the change in the operation of the engine to drive mode, and a torque down instructing means 10 for generating a torque down signal either in case the estimated second throttle opening is not less than a first predetermined reference value, or in case a third throttle opening detected when a second predetermined time has elapsed from the time at which the operation of the engine 2 is changed from driven mode to drive mode with the one-way clutch disengaged, is not less than a second predetermined reference value.

In the control system shown in FIG. 1, in case the estimated second throttle opening is large, the output torque of the engine 2 is reduced. On the other hand, in the control system shown in FIG. 2, even though the estimated throttle opening is small, if an actual throttle opening (third throttle opening) detected is large, the output torque of the engine 2 is also reduced. As a consequence, in any of the above-mentioned control systems, the output torque of the engine 2 is reduced whenever the one-way clutch is engaged, so that the shift shock due to the engagement of the one-way clutch can be lowered or eliminated.

Figure 3:
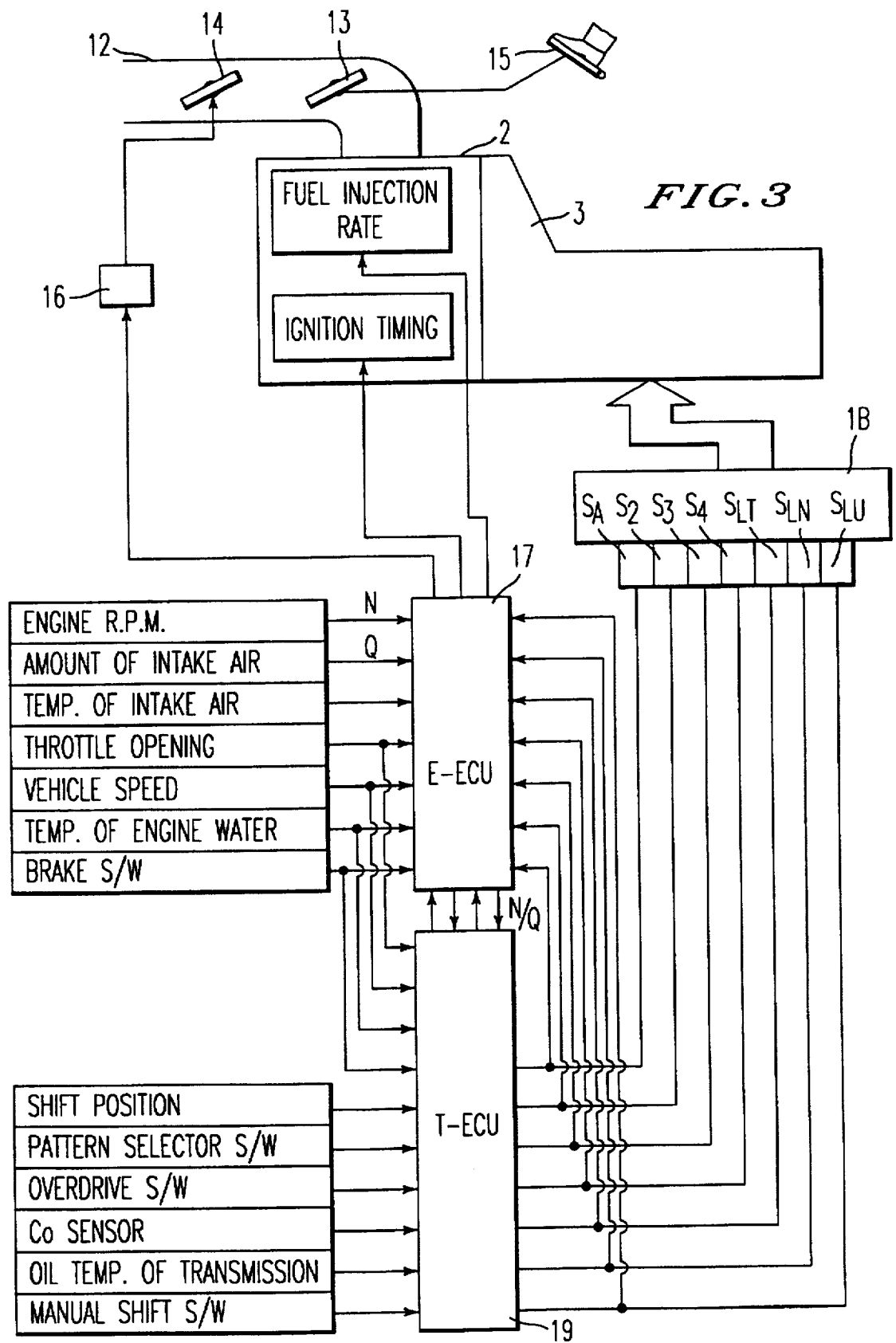
FIG. 3 is a block diagram schematically showing a control system in accordance with the present invention.

Here will be more specifically described the preferred embodiment of the present invention. In FIG. 3, the engine 2 connected to the automatic transmission 3 is equipped in its intake pipe 12 with a main throttle valve 13 and a sub-throttle valve 14 located upstream of the former. The main throttle valve 13 is so connected to an accelerator pedal 15 that it is controlled according to the depression of the accelerator pedal 15. On the other hand, the sub-throttle valve 14 is controlled by a motor 16. There is provided an engine electronic control unit (E-ECU) 17 for controlling the motor 16 to regulate the opening of the sub-throttle valve 14 and for controlling the fuel injection rate and the ignition timing of the engine 2. This electronic control unit 17 is composed mainly of a central processing unit (CPU), memory units (RAM and ROM) and an input/output interface and is fed as control data with a variety of signals including an engine (E/G) revolution speed (R.P.M.) N, an amount Q of intake air, a temperature of intake air, a throttle opening, a vehicle speed, a temperature of engine water and a brake switch.

In the automatic transmission 3, a hydraulic control unit 18 controls the shift, a lockup clutch, a line pressure and/or an engaging pressure of a predetermined frictional engagement means. The hydraulic control unit 18 is so constructed as to be electrically controlled and is equipped with: first to third shift solenoid valves S1 to S3 for executing the shift; a fourth solenoid valve S4 for controlling an engine braking state; a linear solenoid valve SLT for controlling the line pressure; a linear solenoid valve SLN for controlling an accumulator back pressure; and a linear solenoid valve SLU for controlling the engaging pressure of the lockup clutch or a predetermined frictional engagement means.

There is further provided an automatic transmission electronic control unit (T-ECU) 19 for controlling the shift, the line pressure and/or the accumulator back pressure by outputting signals to those solenoid valves. This electronic control unit 19 is composed mainly of a central processing unit (CPU), memory units (RAM and ROM) and an input/output interface and is fed as control data with the throttle opening, the vehicle speed, the engine water temperature, the brake switch signal, a shift position signal, an overdrive switch signal, a signal coming from a C0 sensor for detecting the R.P.M. of a later-described clutch C0, an oil temperature of the automatic transmission and a signal of a manual shift switch.

Moreover, the automatic transmission electronic control unit 19 and the engine electronic control unit 17 are connected with each other for data communications. Specifically, signals such as a signal of an amount (Q/N) of intake air per revolution are sent from the engine electronic control unit 17 to the automatic transmission electronic control unit 19, whereas signals such as a signal equivalent to a command signal for each solenoid valve or a signal for commanding a gear stage are sent from the automatic transmission electronic control unit 19 to the engine electronic control unit 17.

More specifically, the automatic transmission electronic control unit 19 decides the gear stage, the ON/OFF of the lockup clutch, or the regulated pressure level of the line pressure or the engaging pressure on the basis of the data inputted and the map stored in advance and outputs a command signal to a predetermined solenoid valve on the basis of the answer of the decision to decide a failure or performs a control based on the decision. On the other hand, the engine electronic control unit 17 not only controls the fuel injection rate, the ignition timing and/or the opening of the sub-throttle valve 14 on the basis of the data inputted but also lowers the output torque temporarily by reducing the fuel injection rate at the shifting time of the automatic transmission 3, by changing the ignition timing and/or by throttling the opening of the sub-throttle valve 14.

Figure 4:
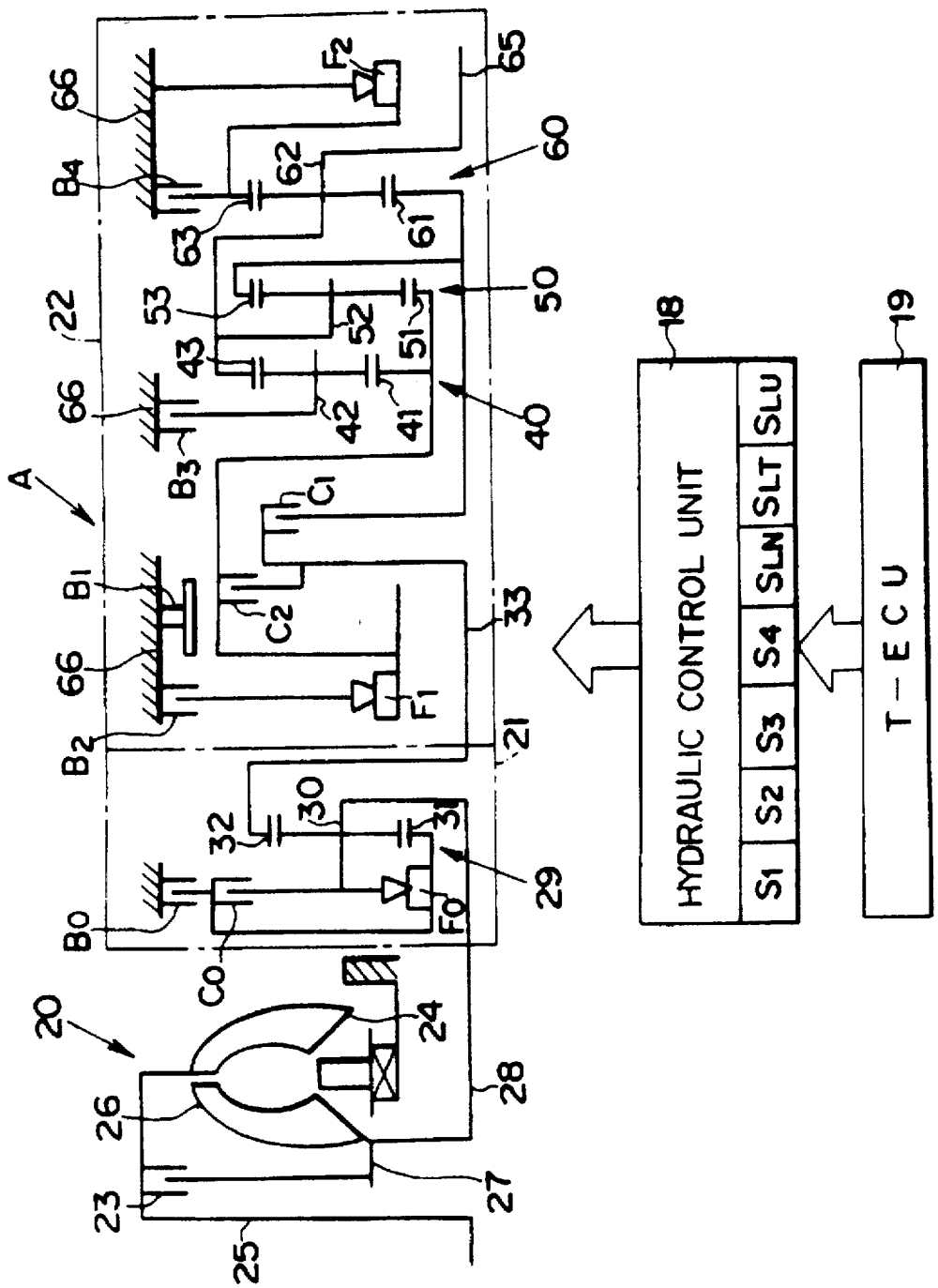
FIG. 4 is a view showing a gear train of an automatic transmission to which the control system according to the present invention is applicable.

FIG. 4 is a diagram showing one embodiment of the gear train of the automatic transmission 3 described above. As shown, the gear train is constructed to set five forward and one reverse gear stages. Specifically, the automatic transmission 3 is constructed of a torque converter 20, an auxiliary transmission unit 21 and a main transmission unit 22. The torque converter 20 is equipped with a lockup clutch 23 which is interposed between a front cover 25 integrated with a pump impeller 24 and a member (or hub) 27 integrated with a turbine runner 26. The engine has its crankshaft (although both are not shown) connected to the front cover 25, and an input shaft 28 having the turbine runner 26 connected thereto is connected to a carrier 30 of an overdrive planetary gear mechanism 29 constituting the auxiliary transmission unit 21.

Between the carrier 30 and a sun gear 31 of the planetary gear mechanism 29, there are interposed the multi-disc clutch C0 and a one-way clutch F0. Incidentally, this one-way clutch F0 is applied in case the sun gear 31 rotates forward (i.e., in the rotating direction of the input shaft 28) relative to the carrier 30. There is also provided a multi-disc brake B0 for braking the rotation of the sun gear 31 selectively. Moreover, a ring gear 32 acting as the output element of the auxiliary transmission unit 21 is connected to an intermediate shaft 33 acting as the input element of the main transmission unit 22.

In the auxiliary transmission unit 21, therefore, the planetary gear mechanism 29 rotates as a whole with the multi-disc clutch C0 or the one-way clutch F0 being applied, so that the intermediate shaft 33 rotates at the same speed as that of the input shaft 28, thus establishing a lower gear stage. With the brake B0 being applied to stop the rotation of the sun gear 31, moreover, the ring gear 32 is accelerated with respect to the input shaft 28 to establish a higher gear stage.

On the other hand, the main transmission unit 22 is equipped with three sets of planetary gear mechanisms 40, 50 and 60, which have their individual rotary elements connected, as follows. Specifically, a sun gear 41 of the first planetary mechanism 40 and a sun gear 51 of the second planetary mechanism 50 are integrally connected to each other. Moreover, a ring gear 43 of the first planetary mechanism 40, a carrier 52 of the second planetary mechanism 50 and a carrier 62 of the third planetary mechanism 60 are connected to one another, and an output shaft 65 is connected to the carrier 62 of the third planetary mechanism 60. In addition, the second planetary mechanism 50 has its ring gear 53 connected to a sun gear 61 of the third planetary mechanism 60.

The gear train of this main transmission unit 22 can set one reverse and four forward gear stages and is composed of the following clutches and brakes for that settings. Of these, the clutches will be described at first. A first clutch C1 is interposed between a ring gear 53 of the second planetary mechanism 50 and the sun gear 61 of the third planetary mechanism 60, which are connected to each other, and the intermediate shaft 33. Moreover, the second clutch C2 is interposed between the sun gear 41 of the first planetary mechanism 40 and the sun gear 51 of the second planetary mechanism 50, which are connected to each other, and the intermediate shaft 33.

Here will be described the brakes. A first brake B1 is a band brake which is arranged to stop the rotations of the sun gears 41 and 51 of the first and second planetary mechanisms 40 and 50. Between these sun gears 41 and 51 (i.e., the common sun gear shaft) and a casing 66, there are arrayed in series a first one-way clutch F1 and a second brake B2 which is a multi-disc brake. Of these, the first one-way clutch F1 is applied when the sun gears 41 and 51 are to rotate backward (of the opposite rotating direction of the input shaft 28). A third brake B3 which is a multi-disc brake is interposed between a carrier 42 of the first planetary mechanism 40 and the casing 66. Between a ring gear 63 of the third planetary mechanism 60 and the casing 66, there are arranged in parallel a fourth brake B4 which is a multi-disc brake for braking the rotation of the ring gear 63 and a second one-way clutch F2. Incidentally, this second one-way clutch F2 is applied when the ring gear 63 is to rotate backward.

The automatic transmission 3 thus far described can set five forward and one reverse gear stages by applying/releasing the individual clutches and brakes, as tabulated in the clutch/brake application chart of FIG. 5. In FIG. 5: symbols ○ indicate the applied state; symbols ● indicate the applied state to be taken at the time of engine braking; symbols Δ indicate the applied or released state; and blanks indicate the released state.

As tabulated in the clutch/brake application chart of FIG. 5, the first speed is set by applying the second one-way clutch F2 and the third speed is set by applying the first one-way clutch F1. Accordingly, when the accelerator pedal 15 is caused to return during driving condition of the vehicle at these speed gear stages and an operation of the engine 2 is thereby changed from drive (power-on) mode to driven (power-off) mode, the automatic transmission 3 is supplied with a torque from the output shaft 65. As a result, the first and second one-way clutches F1 and F2 are disengaged. When the accelerator pedal 15 is depressed to bring the engine 2 into drive (power-on) mode within a period in which any shift is not yet caused, the first and second one-way clutches F1 and F2 are applied with a torque in the opposite direction, so that the one-way clutches are engaged and a corresponding output torque appears on the output shaft 65. In this case, it is likely to generate a remarkably large shock at the first speed gear stage, because the first speed gear stage has a large output torque. In the control system according to the present invention, the control for reducing the output torque of the engine is effected in the following manner.

Figure 6:
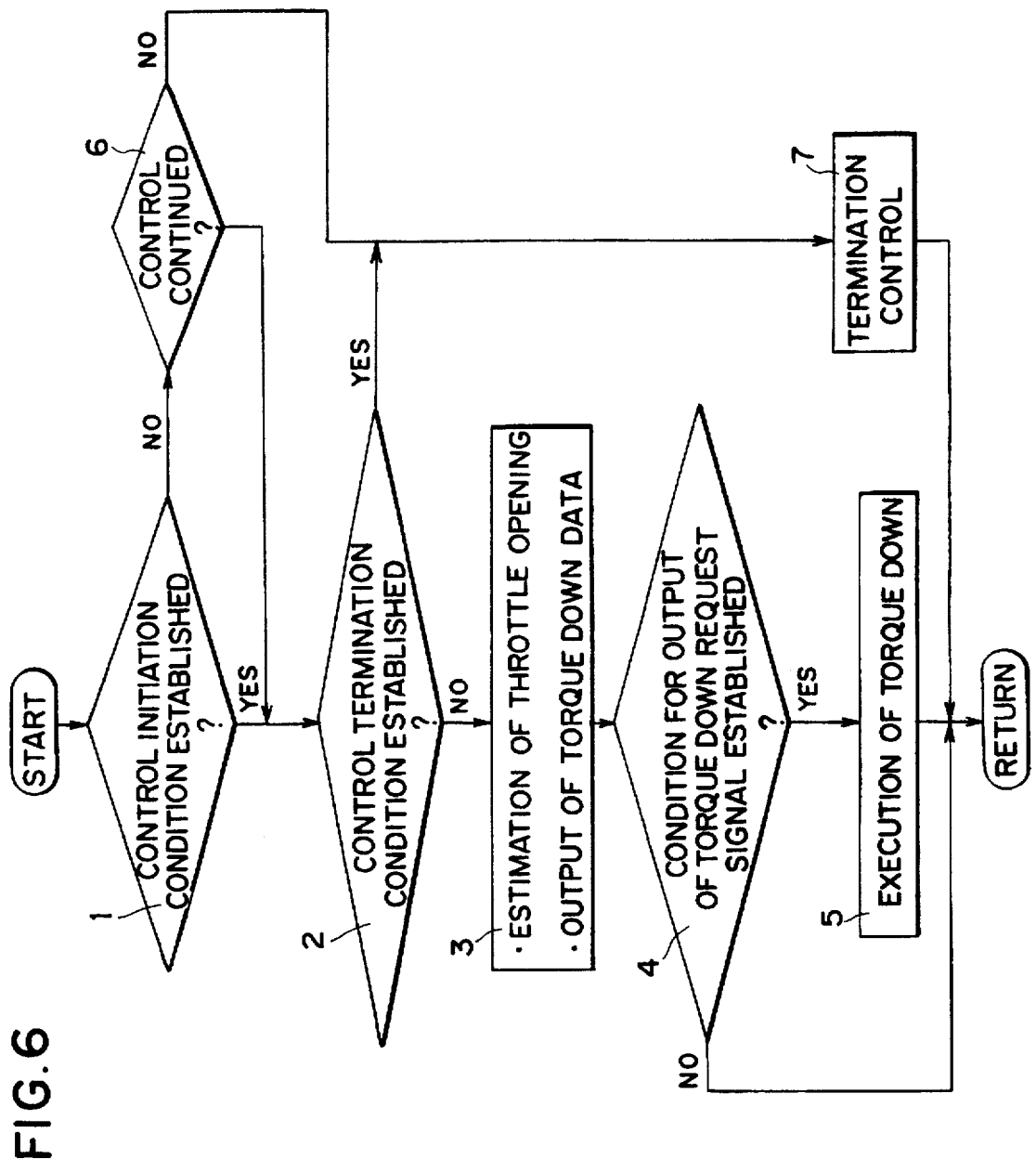
FIG. 6 is a flow chart schematically showing one example of a control routine to execute a torque down control by the control system according to the present invention.

FIG. 6 is a flow chart schematically showing a control routine for effecting the aforementioned torque down control according to the present invention.

In a step 1, after start-up operations such as reading of input signals are conducted, a judgment is made as to whether or not a control initiation condition is established. The establishment of the control initiation condition is judged when all the following conditions (1) to (7) are satisfied.

(1) An idle switch is switched from ON position to OFF position: That is, this represents the condition in which the accelerator pedal 15 is depressed so that the engine is changed from driven (power-off) mode to drive (power-on) mode. A function of the judgment described in the condition (1) corresponds to that provided by the aforementioned power-on detecting means according to the present invention.

(2) A shift signal for setting the first speed gear stage is outputted: This is because the control is performed to prevent a shift shock due to the engagement of the second one-way clutch F2 by which the first speed gear stage is set.

(3) A vehicle speed is not less than a predetermined value: This excludes the case where the control is executed at the time the vehicle starts from the parking condition. This also indicates that the control is performed to prevent the shift shock due to the engagement of the one-way clutch F2 during driving condition of the vehicle. The function described in this condition (3) corresponds to those provided by the vehicle speed detecting means and the judging means for judging whether or not the control initiation condition is established, according to the present invention.

(4) The one-way clutch F2 is in a released condition: This condition can be judged when the input R.P.M. NC0 of the automatic transmission 3 (the input R.P.M. NC0 means a revolution speed of an element of the clutch C0, which element is connected integrally with the turbine runner 26) is lower than a revolution speed obtained by subtracting a predetermined value (for example 50 r.p.m.) from a value obtained by multiplying an output R.P.M. N0 by a gear ratio of the first speed. The function described in this condition (4) corresponds to that provided by the release detecting means according to the present invention.

(5) A forward range other than drive ranges in which the fourth brake B4 is applied, is selected: The fourth brake B4 is disposed in parallel with the second one-way clutch F2. As a consequence, as far as the fourth brake B4 is applied, the second one-way clutch F2 is not changed from disengaged state to engaged state even when the operation of the engine 2 is changed from driven (power-off) mode to drive (power-on) mode.

(6) The engine 2 is not prohibited from the torque down control:

(7) A sensor for detecting the input R.P.M. has a normal function or condition.

After the aforementioned control initiation condition is established, a judgment is made as to whether or not a control termination condition is established (step 2). The establishment of the control termination condition is judged when any of the following conditions (I) to (V) is satisfied.

(I) A predetermined time has elapsed from the time at which a torque restoration initiation condition described in detail hereinafter is established, in which a control variable of the torque down control is gradually decreased: That is, in case the elapsed time from the fulfillment of a condition for returning the engine torque to an inherent level, to the termination of the torque down control becomes prolonged for any reason, there occurs a so-called delayed response. In consequence, the torque down control is terminated by a guard timer.

(II) Control variable of the torque down becomes zero after the establishment of the torque restoration initiation condition: The "zero" control variable indicates the condition in which no torque down control is substantially executed.

(III) The control variable of the torque down control is decreased to a predetermined minimum value or lower after the torque restoration initiation condition is established: The torque down control is effected at a plurality of stages between which the control variable is shared. Therefore, when the control variable reaches the predetermined minimum value and the torque restoration initiation condition is established, the control variable of the torque down control is immediately reset to zero, so that no torque down control is substantially executed.

(IV) A shift signal for the shift to a gear stage other than the first speed, is outputted: This indicates the condition in which the second one-way clutch F2 is disengaged.

(V) The automatic transmission is shifted to such ranges as, for example, L-range, R-range and N-range, other than forward ranges in which the fourth brake B4 connected in parallel with the second one-way clutch F2 is maintained in a released state: In these ranges, there occurs no engagement of the second one-way clutch F2 even when the operation of the engine 2 is changed from driven (power-off) mode to drive (power-on) mode.

In case the judgment at the step 2 is "NO", namely in case the control termination condition is not established, the control routine proceeds to a step 3 at which a throttle opening is estimated and a torque down data is outputted. In the step 3, the throttle opening when a predetermined time has elapsed from the time at which the operation of the engine 2 is changed from power-off mode to power-on mode due to the depression of the accelerator pedal 15, is estimated. In this step, a degree of the throttle opening and an increasing rate thereof are obtained. The estimation may be carried out by various methods, if desired. For example, a throttle opening for a predetermined short period of time is beforehand detected as one cycle. A difference between a throttle opening detected at the present cycle and a throttle opening detected before 2 cycles is multiplied by a predetermined value (for example, 3 times). The thus obtained value is added to the throttle opening of the present cycle to obtain the estimated throttle opening.

On the other hand, the torque down data is data representing a control variable for reducing the output torque of the engine 2. The executable control variables are beforehand divided into a predetermined number of classes from maximum to minimum values and stored in a memory in the form of the mapped values according to the throttle openings. The control variable for the torque down data is read out from such mapped values and the output of the torque down data is fed to the engine electronic control system 17 to control the output torque of the engine 2. Incidentally, the output of the torque down data may be produced simultaneously with an output of the below-mentioned torque down execution signal.

Accordingly, a function of this step 3 corresponds to those provided by the throttle opening detecting means and the throttle opening estimating means according to the present invention.

Next, in a step 4, a judgment is made as to whether or not a condition for output of a torque down request signal is established. This torque down request signal is supplied to the engine electronic control system 17 to execute such a control that the output torque of the engine 2 is reduced. The establishment of the condition for the output of the torque down request signal is judged when any of the following conditions (A), (B) and (C) is satisfied.

(A) The throttle opening when the predetermined time has elapsed from the establishment of the aforementioned control initiation condition, is not less than a predetermined reference value:

(B) The actually detected throttle opening is not less than another predetermined reference value:

(C) The estimated throttle opening reaches a further predetermined reference value.

When the accelerator pedal 15 is depressed, a change in the throttle opening is caused in various manners. In case the accelerator pedal 15 is abruptly depressed with a large stroke, the condition (A) is satisfied so that the condition for the output of the torque down request signal can be established. On the other hand, in case the accelerator pedal 15 is depressed not so rapidly but with a large stroke, the estimated throttle opening does not meet the requirement of the condition (C), namely does not fulfill the requirement that the estimated throttle opening reaches the further predetermined reference value. However, since the actual throttle opening is large, the condition (B) is finally satisfied so that the condition for the output of the torque down request signal is established. In addition, in case the depression of the accelerator pedal 15 is performed slowly, the throttle opening when the predetermined time has elapsed from the establishment of the control initiation condition, does not reach the predetermined reference value. However, even in such a case, if the actual throttle opening is large, the condition (C) is satisfied so that the condition for the output of the torque down request signal is established. That is, in case an amount of the engine torque required by the depression of the accelerator pedal 15 is large, the condition for the output of the torque down request signal is always established irrespective of the manner of depressing the accelerator pedal 15. Moreover, in case the throttle opening is changed in the aforementioned various manners, the establishment of the condition for the output of the torque down request signal is judged by whichever occurs earlier.

When the judgment at the step 4 is "NO", the control routine returns. On the other hand, in case the judgment at the step 4 is "YES", the control routine proceeds to a step 5 at which the torque down control is executed. Specifically, a flag, which serves for instructing whether or not the torque down control is to be executed, is set to "1" so that the torque down execution signal is fed to the engine electronic control system 17 to control the output torque of the engine 2. Accordingly, a function of this step 5 corresponds to that provided by the torque down instructing means according to the present invention.

On the other hand, in case the judgment at step 1 is "NO" because of no establishment of the control initiation condition, the control routine proceeds to the step 6 at which a judgment is made as to whether the torque down control is continued or not. If the torque down control is continued, the control routine proceeds to the step 2, whereas, if the torque down control is not continued, the control routine proceeds to a step 7 at which a termination control is executed. Further, in case the control termination condition is established at the step 2, the control routine also proceeds to the step 7 so that the termination control is executed in a similar manner. Specifically, this termination control may be executed by setting the aforementioned flag, which serves for instructing whether or not the torque down control is to be executed, to "0" so that a control termination signal is supplied to the engine electronic control system 17, whereby control variables for a timer or the like are reset to zero.

Incidentally, here will be described the torque restoration control. The establishment of the torque restoration condition is judged when either of the following condition (a) or (b) is satisfied. A function of this judgment corresponds to that provided by the torque restoration condition-judging means according to the present invention.

(a) A predetermined time has elapsed from the time at which the input R.P.M. NC0 is synchronized with the revolution speed of the first speed gear stage: Specifically, the establishment of the condition (a) can be judged in case a predetermined reference time has elapsed from the time at which the input R.P.M. NC0 reaches or exceeds a revolution speed which is obtained by subtracting a predetermined value from a value obtained by multiplying the output R.P.M. NO by the gear ratio of the first speed gear stage. That is, even when the second one-way clutch F2 is engaged, some torsion is likely to occur due to looseness of other elements or an elastic deformation of the transmission system. For this reason, it is necessary that the restoration control for returning the engine torque to an inherent state is performed after the predetermined time has elapsed from the time at which the synchronous revolution speed is reached. This prevents occurrence of shock at that time.

(b) A elapsed time from the time at which the control initiation condition is established reaches or exceeds a predetermined value. This condition is a so-called guard by timer.

In case the torque restoration initiation condition is established, the torque down control variable as the torque down data is so controlled as to be decreased in a stepped manner every constant elapsed time, so that the engine torque gradually returns to its inherent state, namely to a normal torque corresponding to the depression of the accelerator pedal 15. Incidentally, the torque down control may be carried out by retarded angle control of an ignition timing. In addition, the torque down control can be effected by closing a sub-throttle valve 14 or by reducing a fuel injection rate. Accordingly, the torque restoration control can be achieved by returning these parameters to their inherent values.

As described above, in accordance with the present invention, in case the operation of the engine is switched from driven (power-off) mode to drive (power-on) mode with the automatic transmission at the first speed gear stage, the throttle opening when a predetermined time has elapsed from the time at which the switching of the engine operation occurs, is estimated on the basis of the throttle opening detected at the time of switching the engine operation. If the estimated throttle opening is large, a control for reducing the output torque of the engine is immediately executed. As a result, the output torque of the engine can be reduced to a sufficient low level before the second one-way clutch F2 is engaged to set the first speed gear stage. In other words, since the torque down control is performed without delay, occurrence of the shift shock due to the engagement of the second one-way clutch F2 can be surely reduced or eliminated. In addition, even when the accelerator pedal 15 is slowly depressed so that the estimated throttle opening is smaller than the predetermined reference value, as far as the actual throttle opening detected when the predetermined time has elapsed from the time at which the operation of the engine is changed from power-off mode to power-on mode, is relatively large (namely as far as the actual throttle opening is the predetermined reference value or higher), the torque down control is executed. Consequently, since reduction of the engine torque is already done at the time at which the second one-way clutch is engaged, the shift shock due to the engagement of the second one-way clutch F2 can be surely reduced or eliminated. That is, according to the present invention, the shift shock due to the engagement of the one-way clutch, which is caused after the change in engine operation to the power-on mode, is prevented by estimating the throttle opening at the time at which the one-way clutch is engaged, whereby the torque down control can be executed without delay.

Meanwhile, in the aforementioned embodiments, a control system according to the present invention is applied to the automatic transmission equipped with the gear train as shown in FIG. 4. Further, in such an automatic transmission, the torque down control is carried out in case the first speed gear stage is set. However, as will be apparently understood, the present invention is not restricted to the particular embodiments but the control system is also applicable to those equipped with gear trains other than those shown in FIG. 4. In addition, a gear stage to be controlled by the control system according to the present invention may be those other than the first speed gear stage.

Finally, advantages of the present invention are generally described below. In the control system according to the present invention, the throttle opening when a predetermined time has elapsed from the time at which the engine operation is changed over from power-off mode to power-on mode, is estimated based on the throttle opening upon the change in the engine operation to power-on mode. If the estimated throttle opening is not less than the predetermined reference value, the torque down control for reducing the output torque of the engine is executed. In another configuration of the control system according to the present invention, either in case the estimated throttle opening is not less than the predetermined reference value, or in case the throttle opening detected when another predetermined time has elapsed from the time at which the operation of the engine is changed to power-on mode, is not less than another predetermined reference value, the torque down control for reducing the output torque of the engine is executed. Accordingly, in the control system according to the present invention, the judgment as to whether the torque down control is executed or not, is made not on the basis of a revolution speed of the rotary element of the automatic transmission but on the basis of the throttle opening which has a direct relationship to the output torque of the engine. Therefore, the torque down control for preventing the shift shock due to the engagement of the one-way clutch can be carried out without delay. As a result, the output torque of the engine is decreased to a sufficiently low level at the time when the one-way clutch is engaged in association with the change in the engine operation to power-on mode. This results in surely reducing or eliminating the shift shock due to the engagement of the one-way clutch.

What is claimed is:

1. A control system for an automatic transmission having a plurality of gear stages, which is capable of generating a torque down signal for reducing an output torque of an engine connected to the automatic transmission when a one-way clutch for setting a given gear stage is changed from disengaged state to engaged state in non-shift condition of the automatic transmission, comprising:

a release detecting means for detecting disengagement of said one-way clutch;

a power-on detecting means for detecting change in an operation of said engine from driven mode to drive mode;

a throttle opening detecting means for detecting a throttle opening of said engine;

a throttle opening estimating means for estimating a second throttle opening when a predetermined time has elapsed from the time at which the operation of the engine is changed from driven mode to drive mode, on the basis of a first throttle opening detected when the operation of the engine is changed from driven mode to drive mode; and a torque down instructing means for generating a torque down signal for reducing said output torque of the engine in case said estimated second throttle opening is not less than a predetermined reference value.

2. The control system according to claim 1, further comprising a vehicle speed detecting means and a judging means for judging establishment of an control initiation condition upon which said torque down signal for reducing the output torque of the engine is generated by said torque down instructing means, when a vehicle speed detected by said vehicle speed detecting means is not less than a predetermined value.

3. The control system according to claim 1, wherein said release detecting means includes a means for detecting disengagement of said one-way clutch, on the basis of a relation between an input R.P.M., an output R.P.M. and a gear ratio of said given gear stage of the automatic transmission.

4. The control system according to claim 1, further comprising a torque restoration condition judging means for judging establishment of a torque restoration condition upon which the output torque of the engine is restored to an inherent state corresponding to an actual throttle opening after the output torque of the engine is reduced based on said torque down signal.

5. The control system according to claim 4, wherein said torque restoration condition judging means includes a means for judging the establishment of the torque restoration condition when a predetermined time has elapsed from the time at which the input R.P.M. of the automatic transmission is synchronized with a revolution speed of the gear stage set by engagement of the one-way clutch.

6. A control system for an automatic transmission having a plurality of gear stages, which is capable of generating a torque down signal for reducing an output torque of an engine connected to the automatic transmission when a one-way clutch for setting a given gear stage is changed from disengaged state to engaged state in non-shift condition of the automatic transmission, comprising:

a release detecting means for detecting disengagement of said one-way clutch;

a power-on detecting means for detecting change in an operation of said engine from driven mode to drive mode;

a throttle opening detecting means for detecting a throttle opening of said engine;

a throttle opening estimating means for estimating a second throttle opening when a first predetermined time has elapsed from the time at which the operation of the engine is changed from driven mode to drive mode with the one-way clutch disengaged, on the basis of a first throttle opening detected when the operation of the engine is changed from driven mode to drive mode; and a torque down instructing means for generating a torque down signal for reducing the output torque of the engine, either in case said second throttle opening estimated by said throttle opening estimating means is not less than a first predetermined reference value, or in case a third throttle opening when a second predetermined time has elapsed from the time at which the operation of engine is changed from driven mode to drive mode with the one-way clutch disengaged, is not less than a second predetermined reference value.

7. The control system according to claim 6, further comprising a vehicle speed detecting means and a judging means for judging establishment of an control initiation condition upon which said torque down signal for reducing the output torque of the engine is generated by said torque down instructing means, when a vehicle speed detected by said vehicle speed detecting means is not less than a predetermined value.

8. The control system according to claim 6, wherein said release detecting means includes a means for judging disengagement of said one-way clutch, on the basis of a relation between an input R.P.M., an output R.P.M. and a gear ratio of said given gear stage of the automatic transmission.

9. The control system according to claim 6, further comprising a torque restoration condition judging means for judging establishment of a torque restoration condition upon which the output torque of the engine is restored to an inherent state corresponding to an actual throttle opening, after the output torque of the engine is reduced based on said torque down signal.

10. The control system according to claim 9, wherein said torque restoration condition judging means includes a means for judging the establishment of the torque restoration condition when a predetermined time has elapsed from the time at which the input R.P.M. of the automatic transmission is synchronized with a revolution speed of the gear stage set by engagement of the one-way clutch.

* * * * *